(12) United States Patent
Shiokawa et al.

(10) Patent No.: US 7,808,684 B2
(45) Date of Patent: Oct. 5, 2010

(54) IMAGE READING APPARATUS AND COPYING APPARATUS

(75) Inventors: Tsuyoshi Shiokawa, Hachioji (JP); Mitsuru Nagoshi, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1050 days.

(21) Appl. No.: 11/516,429

(22) Filed: Sep. 6, 2006

(65) Prior Publication Data

US 2007/0064283 A1 Mar. 22, 2007

(30) Foreign Application Priority Data

Sep. 20, 2005 (JP) .............................. 2005-271687

(51) Int. Cl.
H04N 1/04 (2006.01)
(52) U.S. Cl. ................. 358/498; 358/474; 358/496; 358/486; 358/488; 271/265.04; 271/262; 271/186; 399/367; 399/85
(58) Field of Classification Search .......... 358/474, 358/498, 496, 486, 448, 493; 271/265.04, 271/262, 242, 186; 399/85, 367, 3.02
See application file for complete search history.

(56) References Cited

U.S. PATENT DOCUMENTS

| | | | | |
|---|---|---|---|---|
| 4,419,007 A | * | 12/1983 | Kingsley | 399/85 |
| 4,743,974 A | * | 5/1988 | Lockwood | 358/494 |
| 5,298,937 A | * | 3/1994 | Telle | 355/23 |
| 5,392,135 A | * | 2/1995 | Amemiya | 358/444 |
| 5,463,451 A | * | 10/1995 | Acquaviva et al. | 399/211 |
| 6,209,861 B1 | * | 4/2001 | Kakuta et al. | 271/3.02 |
| 7,142,335 B2 | * | 11/2006 | Tesavis | 358/474 |
| 7,298,388 B2 | * | 11/2007 | Hsieh et al. | 347/218 |
| 7,511,862 B2 | * | 3/2009 | Sano et al. | 358/474 |
| 7,525,692 B2 | * | 4/2009 | Nakaya | 358/461 |
| 2002/0039207 A1 | * | 4/2002 | Kanda | 358/498 |
| 2002/0174225 A1 | * | 11/2002 | Smith et al. | 709/226 |
| 2005/0162712 A1 | * | 7/2005 | Shiraishi et al. | 358/474 |
| 2005/0185229 A1 | * | 8/2005 | Sano et al. | 358/498 |

(Continued)

FOREIGN PATENT DOCUMENTS

JP 09-027910 1/1997

(Continued)

OTHER PUBLICATIONS

A Notification of Reasons for Refusal issued by JPO on Jun. 15, 2010, in connection with Application No. 2005-271687, 3 pgs.

(Continued)

Primary Examiner—Negussie Worku
(74) Attorney, Agent, or Firm—Squire, Sanders & Dempsey L.L.P.

(57) ABSTRACT

An image reading apparatus including: a circulating transport path for transporting an original document to circulate; plural reading sections for reading a single image plane on a same single face of the original document at plural times at plural positions in the circulating transport path, and for generating plural image data sets for the single image plane; and an image processing section for processing the plural image data sets generated by the plural reading sections, and creating one image data set for the single image plane.

7 Claims, 8 Drawing Sheets

U.S. PATENT DOCUMENTS

| | | | |
|---|---|---|---|
| 2005/0254105 A1* | 11/2005 | Muzzin et al. | 358/498 |
| 2006/0291013 A1* | 12/2006 | Shimizu | 358/498 |
| 2007/0047026 A1* | 3/2007 | Shiokawa et al. | 358/486 |
| 2007/0064286 A1* | 3/2007 | Shiokawa et al. | 358/498 |
| 2007/0069415 A1* | 3/2007 | Moriyama et al. | 264/140 |

FOREIGN PATENT DOCUMENTS

| | | |
|---|---|---|
| JP | 09-135344 | 5/1997 |
| JP | 2000-078409 | 3/2000 |
| JP | 2001-157005 | 6/2001 |
| JP | 2002-223339 | 8/2002 |
| JP | 2003-283824 | 10/2003 |

OTHER PUBLICATIONS

Translation of a Notification of Reasons for Refusal issued by JPO on Jun. 15, 2010, in connection with Application No. 2005-271687, 3 pgs.

* cited by examiner

IMAGE READING APPARATUS AND COPYING APPARATUS

CROSS REFERENCE TO RELATED APPLICATION

The present application is based on Japanese Patent Application No. 2005-271687 filed with Japan Patent Office on Sep. 20, 2005, the entire content of which is hereby incorporated by reference.

BACKGROUND OF THE INVENTION

1. Field of the Invention

The present invention relates to an image reading apparatus and a copying apparatus having the image reading apparatus.

2. Description of Related Art

Image reading apparatuses have been widely used for copying apparatuses and facsimile machines, etc. in which one reading section faces a transport path of original document, and conducts reading of multiple original documents by passing the documents through a reading position.

As represented by colorization of images, demand for high quality images is increasing for image forming apparatuses such as electrophotographic image forming apparatuses.

In order to reproduce high quality images, an image reading apparatus with enhanced performances is necessary, as well as image forming apparatus with enhanced performances.

Enhanced performances of the image reading apparatus depends largely on improvement of image capturing elements such as CCD. However, since image quality improvement by enhancing performances of the image capturing elements has a certain limitation, it is inevitable for high performance image reading to have some restrictions such as decreasing reading speed.

Patent Documents 1 and 2 propose to improve an image quality by preventing a backside ghost image (phenomenon that backside image of original document appears on a copy of front-side image), which appears when reading an original document having high optical transmittance. Namely, Patent Documents 1 and 2 propose to improve an image quality by preventing a specific phenomenon of the backside ghost image.

Patent Document 1: Unexamined Japanese Patent Application Publication No. H09-135344

Patent Document 2: Unexamined Japanese Patent Application Publication No. 2003-283824

Although, the proposals of Patent Documents 1 and 2 are to improve an image quality by preventing a specific phenomenon of the backside ghost image, as the causes to deteriorate the image quality in the course of image reading, there are many causes such as attachment of dust such as paper dust onto a reading window of the image reading apparatus, and failure in pixel units of image capturing elements such as CCD, which receives light reflected from or transmitted through an original document and converts into electrical signals. There has been no effective technical measure to prevent the image deterioration caused by these phenomena.

Further, in Patent Documents 1 and 2, since a sensor to correct the backside ghost image is the sensor exclusive for correcting the backside ghost image, in cases where an image reading apparatus is required to be used as a multifunctional apparatus such as having single face reading and double face reading function, many reading sensors are needed and the structure of the apparatus tends to become complex.

SUMMARY

A structure reflecting one aspect of the present invention is:

(1) An image reading apparatus including:

a circulating transport path for conveying an original document with circulation;

plural reading sections for reading a single image on a same single side the original document at plural times at plural position in the circulating transport path, and for generating plural image data for the single image; and an image processing section for processing the plural image data generated by the plural reading sections, and for generating one image data for the single image.

Another structure reflecting another aspect of the present invention is:

(2) A copying apparatus including:

the image reading apparatus described in structure (1); and an image forming apparatus for forming an image based on the image data generated by the image reading apparatus.

BRIEF DESCRIPTION OF THE DRAWINGS

These and other objects, advantages and features of the invention will become apparent from the following description thereof taken in conjunction with the accompanying drawings in which:

FIGS. 3(*a*)-3(*d*) are diagrams showing operations of an image reading apparatus in the case of single face reading in normal mode;

FIGS. 4(*a*)-4(*i*) are diagrams showing operations of an image reading apparatus in the case of double face reading in normal mode;

FIGS. 5(*a*)-5(*e*) are diagrams showing operations of an image reading apparatus in the case of single face reading in high image quality mode;

FIGS. 7(*a*)-7(*b*) illustrate patterns of image failures;

FIGS. 8(*a*)-8(*b*) illustrate patterns of image failures;

FIGS. 9(*a*)-9(*i*) are diagrams showing an example operation of an image reading apparatus in the case of double face reading in high image quality mode; and FIGS. 10(*a*)-10(*l*) are diagrams showing anther example operation of an image reading apparatus in the case of double face reading in high image quality mode.

DETAILED DESCRIPTION OF THE PREFERRED EMBODIMENTS

Embodiments of the present invention will be described below, however, the present invention is not construed to be restricted to these embodiments.

Copying Apparatus

Figure 1:
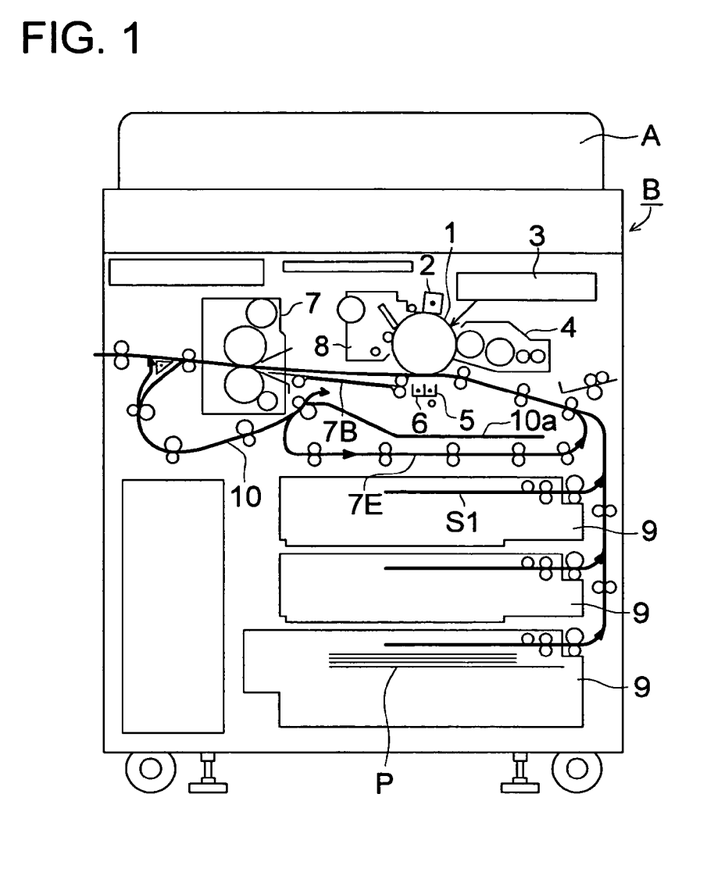
FIG. 1 is an overall diagram of a copying apparatus relating to an embodiment of the present invention.

FIG. 1 shows an overall view of a copying apparatus relating to the embodiment of the present invention.

The copying apparatus is provided with an image reading apparatus A and an image forming apparatus B.

Image reading apparatus A, as described below, transports one by one multiple original documents stacked on a sheet supply section, and performs single face reading, as well as double face reading if necessary to form image data.

In image forming apparatus B, 1 denotes a photoreceptor, which is preferably an organic photoreceptor comprising a photosensitive layer including an organic photoconductor dispersed in resin. The photoreceptor is not restricted to this type, but any known photoreceptor may be utilized.

Further, photoreceptor 1 is not restricted to a drum type as shown in FIG. 1, but may instead be a belt type photoreceptor. Item 2 indicates a charging device which electrically charges the photoreceptor 1 to form a uniform electric potential on the photoreceptor 1. Charging device 2 is preferably a scorotron charger having a control grid and a charging electrode, or a contact charging type charger using a voltage applied roller.

Item 3 indicates an exposure device to expose image data onto the photoreceptor 1. As exposure device 3, preferable are a scanning exposure device having a scanning optical system comprising a laser diode light source, a polygonal mirror, lens and mirrors; and a scanning optical device comprising a light-emitting diode and an optical fiber image focusing member, however, the exposure device is not meant to be restricted to these types and any known exposure devices may be utilized. Exposure device 3 performs dot exposure on photoreceptor 1 according to image data.

Item 4 indicates a developing device which contains two-component developer or single component developer and develops an electrostatic image on photoreceptor 1 to form a toner image. Item 5 indicates a transfer device including a corona charger. Transfer device 5 charges the recording member Pa at the reverse polarity of the toner polarity to transfer the toner image onto the recording member Pa. Item 6 indicates a separating device comprising a corona charger. Separating device 6 applies alternating-current corona charging onto recording member Pa and neutralizes charges on recording member Pa to easily separate it from photoreceptor 1.

Item 7 indicates a fixing device, item 8 indicates a cleaning device, and item 9 indicates a recording member container structured with a tray or a cassette which can be replenished with recording member Pa by drawing the container out of the image forming apparatus.

By charging, exposing, and developing, a toner image is formed on photoreceptor 1, and by transfer device 5, the toner image is formed on recording member Pa. The toner image is fixed on the recording member by fixing device 7. After transfer, photoreceptor 1 is cleaned by cleaning device 8.

Item 10 indicates a transport path, to form a rear face image, comprising reversal transport path 10a to reverse front/rear faces of recording member Pa.

Structure of Image Reading Apparatus

Figure 2:
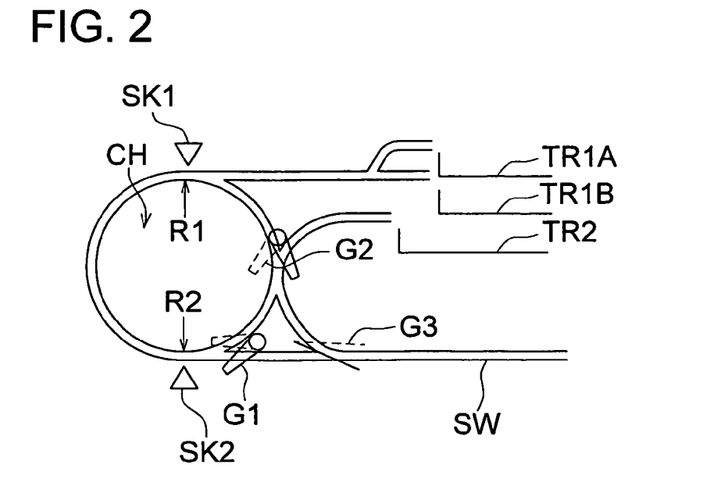
FIG. 2 is a diagram showing a structure of an image reading apparatus relating to an embodiment of the present invention.

FIG. 2 shows a basic structure of the image reading apparatus relating to the embodiment of the present invention.

Image reading apparatus A comprises sheet supply trays TR1A and TR1B as a sheet supplying section; sheet exit tray TR2 as a sheet ejecting section; reading sensor SK1 as a first reading section; reading sensor SK2 as a second reading section; circulating transport path CH which circulates the original document; switchback section SW; first gate G1 and second gate G2 for switching the transport path; and guide member G3

Regarding reading sensors SK1 and SK2, used can be a reduction imaging optical system, a CCD reading sensor, a contact sensor having a contact type line sensor or the like, which are conventionally known.

Switchback section SW is structured with a transport path which reverses front/rear faces of the carried-in original document and carries-out it, by executing a switchback transport of the original document. First and second gates G1, G2 are controlled to switch between positions indicated by broken and solid lines. Guide member G3 is composed of a plate member biased by resilient plate member such as PET film or by springs, which are normally placed at the positions indicated by solid lines, and displaced to positions indicated by broken lines to guide the original document in a specific way when the original document passes through and pushes against the guide member.

As shown in FIG. 2, circulating transport path CH is formed approximately circular. Reading sensors SK1 and SK2 read images on the original documents at the first and second reading positions R1 and R2 located at opposing positions to each other on the circle formed by circulating transport path CH. In an embodiment of the present invention, normal mode image reading and high image quality mode image reading can be executed.

Normal Mode (Single Face Reading)

Figure 3:
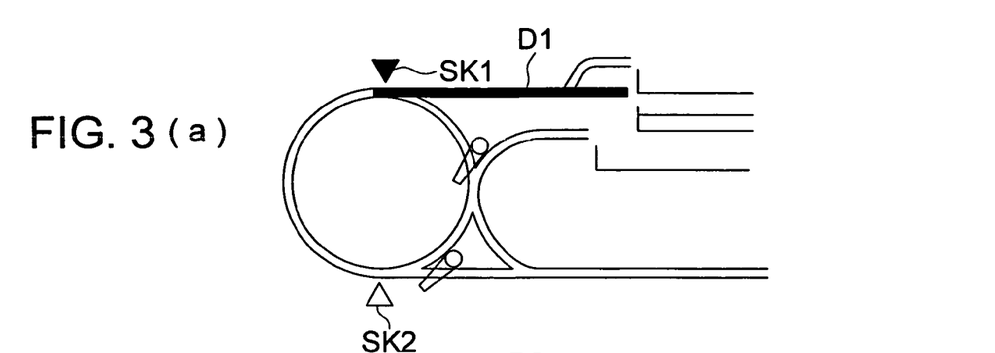

FIGS. 3(*a*)-3(*d*) show operations of an image reading apparatus in the case of single face reading with the normal mode.

In FIG. 3(*a*)-(*d*), to avoid complications, notations of other than the reading sensors and the original documents are omitted. The following descriptions refer to the notations shown in FIG. 2. Further, in FIGS. 3(*a*)-(*d*), the reading sensor conducting reading operation is illustrated by a solid triangle mark, and the reading sensor inactivated for reading operation is illustrated by an outline triangle mark.

First original document D1 is supplied to first reading position R1 and reading of original document D1 is conducted (FIG. 3(*a*)). Following to original document D1, second original document D2 is supplied, however, reading sensor SK1 does not conduct reading of original document D2. Further, original document D1 passes through second reading position R2, however, reading sensor SK2 does not conduct reading of original document D1 (FIG. 3(*b*)).

Following to original document D2, third original document D3 is supplied to first reading position R1, and reading sensor SK1 conducts reading of original document D3. Further, reading sensor SK2 conducts reading of original document D2 (FIG. 3(*c*)).

Following to original document D3, fourth original document D4 is supplied to first reading position R1, however, reading sensor SK1 does not conduct reading of original document D4, and reading sensor SK2 does not conduct reading of original document D3 (FIG. 3(*d*)).

In this way, odd-numbered original documents D1, D3 . . . are read by reading sensor SK1, and even-numbered original documents D2, D4 . . . are read by reading sensor SK2.

In the period during odd-numbered original document moves from first reading position R1 to second reading position R2, as shown in FIG. 4(*b*) and FIG. 4(*d*), since the reading is not conducted, transporting speed of the original document is not restricted. Therefore, by conducting high speed transporting of the original document in this period, overall reading speed of the original documents can be increased.

(Double Face Reading)

FIGS. 4(*a*)-4(*i*) are diagrams showing operations of an image reading apparatus in the case of double face reading in normal mode.

First original document D1 is supplied to first reading position R1, and the first face of original document D1 (upper face of original document stacked at sheet supply trays TR1A and TR1B) is read by reading sensor SK1 (FIG. 4(*a*)).

After being read by reading sensor SK1, original document D1 proceeds along circulating transport path CH and passes through second reading position R2 without being read by reading sensor SK2 (FIG. 4(*b*)).

Figure 4A:
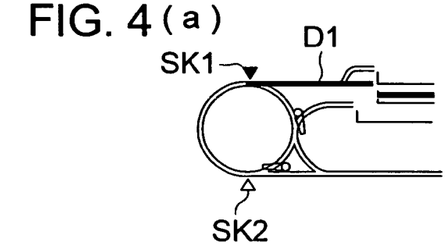
Figure 4B:
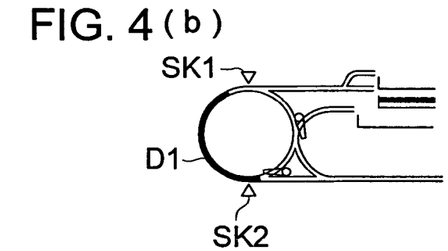
Figure 4C:
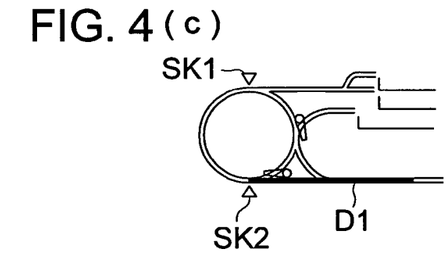
Figure 4D:
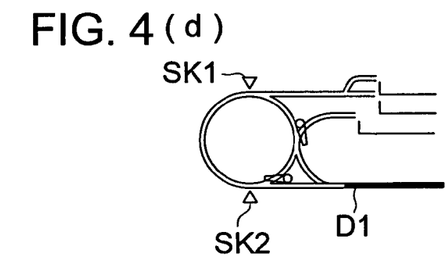
Figure 4E:
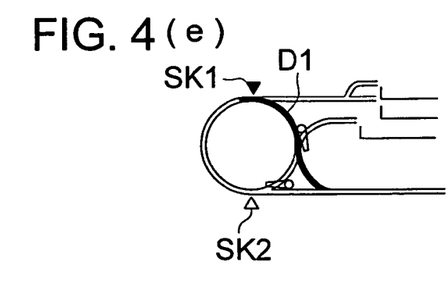

After passing second reading position R2, original document D1 is guided by gate G1 to enter into switchback section SW (FIG. 4(c), FIG. 4(d)).

From switchback section SW, original document D1 is guided by gate G2 to proceed along circulating transport path CH, and passes through first reading position R1. At that time the second face of original document D1 (rear face of original document stacked at sheet supply trays TR1A and TR1B) is read by reading sensor SK1 (FIG. 4(e)).

Figure 4F:
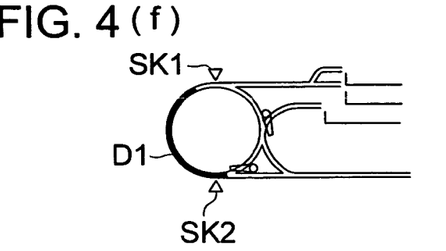
Figure 4G:
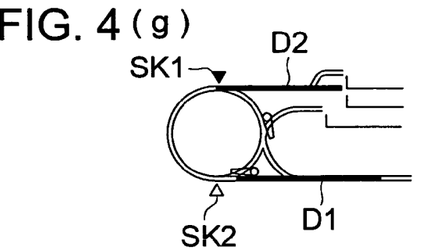
Figure 4H:
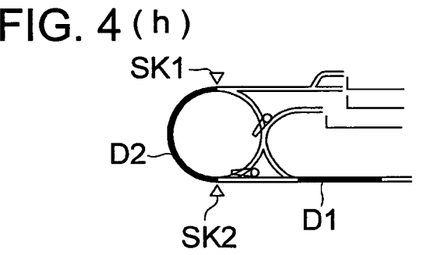

After being read at the second face, original document D1 proceeds along circulating transport path CH and enter into switchback section SW (FIG. 4(f), FIG. 4(g)).

Figure 4I:
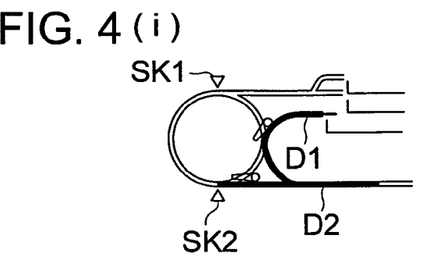
Figure 5:
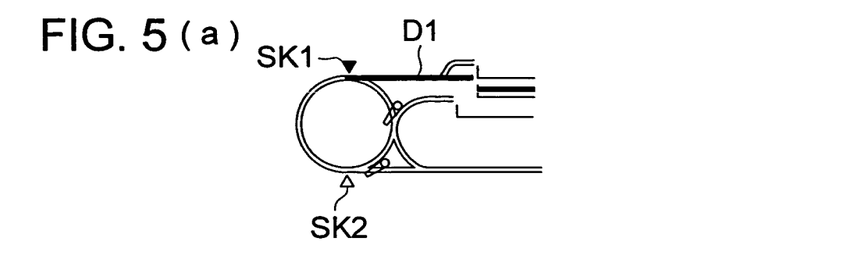

From switchback section SW, original document D1 is guided by gate G2, which has been switched, to be ejected onto exit TR2 (FIG. 4(i)).

Second original document D2 is supplied to first reading position R1 at the stage shown in FIG. 4(g) when first original document D1 enter into switchback section SW after the second face having been read.

Second original document D2 is read at both faces through the similar process as that of original document 1.

High Image Quality Mode

In the high image quality mode, a single image plane is read by two reading sensors SK1 and SK2.

In this twice reading, high image quality can be achieved by providing different functions with each other to reading sensor SK1 and reading sensor SK2. For example, by changing the exposure angle or directivity of original exposure light between first reading position R1 and second reading position R2, enhanced is the preventive effect from backside ghost image (phenomenon that backside image of original document appears on the copy of front-side image).

Firstly, single face reading in high image quality mode will be explained by referring to FIG. 5(a) to FIG. 8(b).

(Single Face Reading)

Figure 6:
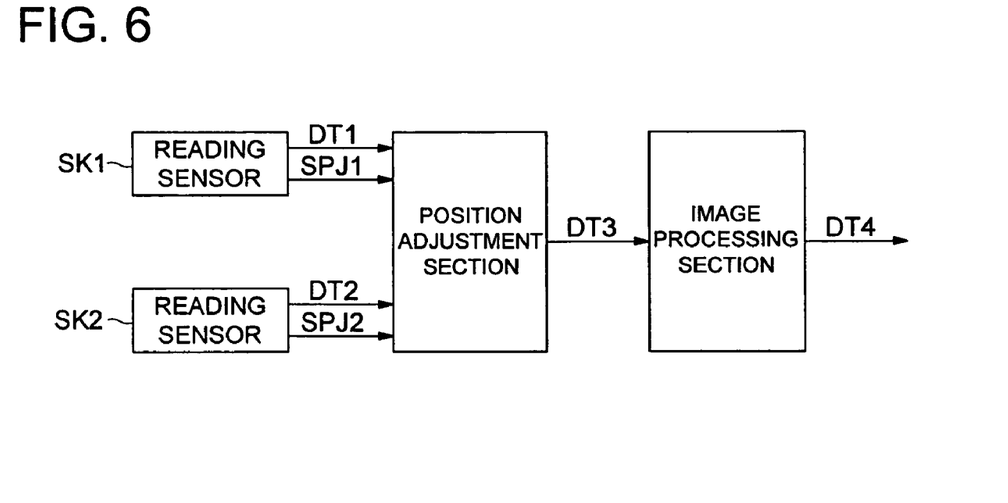
FIG. 6 is a block diagram of a control system in an image reading apparatus relating to an embodiment of the present invention.
Figure 7:
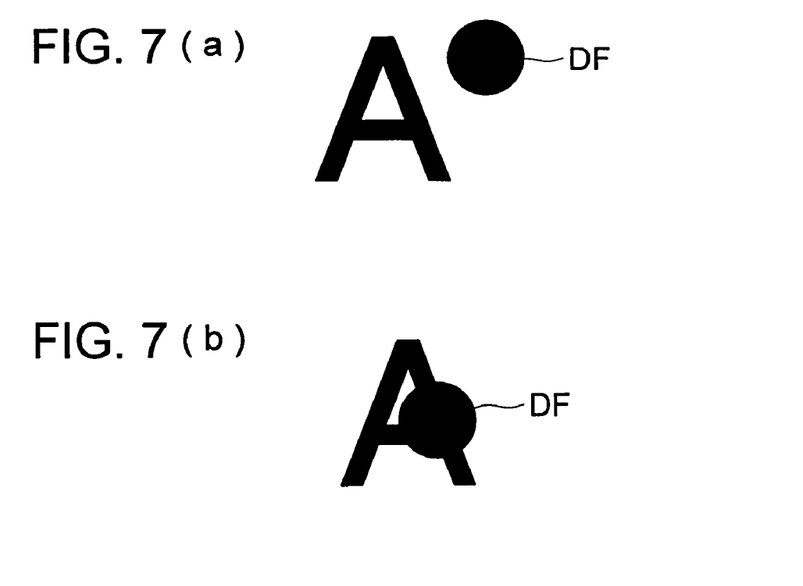

FIGS. 5(a)-5(e) are diagrams showing operations of an image reading apparatus in the case of single face reading in high image quality mode; FIG. 6 is a block diagram of a control system in an image reading apparatus relating to an embodiment of the present invention; FIGS. 7(a)-7(b) and FIGS. 8(a)-8(b) illustrate patterns of image failures.

By referring to FIGS. 5(a)-5(e), operations of the image reading apparatus in the case of single face reading will be explained, wherein to avoid complications notations of other than the reading sensors and the original documents are omitted. The following descriptions refer to the notations shown in FIG. 2. Further, in FIGS. 5(a)-(e), the reading sensor conducting reading operation is illustrated by a solid triangle mark, and the reading sensor inactivated for reading operation is illustrated by an outline triangle mark.

As shown in FIG. 5(a), first original document D1 carried-out from sheet supply tray TR1A or TR1B passes through first reading position R1, and reading sensor SK1 conducts a first time reading.

After having been read by reading sensor SK1, original document D1 proceeds to second reading position R2. In the case of single face reading, gate G1 resides at the position indicated by FIG. 5(a)-5(e) (position shown by solid line in FIG. 2) and prevents original document from entering into switchback section SW. Further, gate G2 resides at the position indicated by FIG. 5(a)-5(e) (position shown by doted line in FIG. 2) and guides the original document onto exit tray TR2.

Original document D1 passes through reading position R2 of reading sensor SK2, reading sensor SK2 conducts second time reading of original document D1 (FIG. 5(b)), and after the reading by reading sensor SK2 original document D1 is ejected onto exit tray TR2 (FIG. 5(c)). Around the time when trailing edge of first original document D1 passes second reading position R2, second original document D2 is supplied to be conducted first reading by reading sensor SK1.

Two time readings by reading sensors SK1 and SK2 are conducted also for second original document D2 as shown in FIGS. 5(c) and 5(d). In this way, two time readings are conducted for each of successively supplied originals.

Thus, an image on an original document is read twice by reading sensors SK1 and SK2, then as shown in FIG. 6, outputs DT1 and DT2 from sensors SK1 and SK2 are adjusted in position at position adjustment section PJ to form DT3. DT3 is processed at image processing section GP and one image data DT4 is outputted from image processing section GP. Incidentally, in the present specification, image data generated by reading one image plane with one reading means (reading sensor SK1, for example) is referred as one image data set. Therefore, image data generated by reading plural image planes with one reading means, or image data generated by reading one image plane with plural reading means contain plural image data sets.

The position adjustment of outputs DT1 and DT2 is executed based on original document detection signals from reading sensor SK1 and SK2. Position adjustment section PJ adjusts the positions of outputs DT1 and DT2 by using signals SPJ1 and SPj2, which are signals of outlines generated through reading an original document outline by reading sensors SK1 and SK2.

FIGS. 7(a), (b) show example patterns of image failure in cases where reading failures are generated at reading sensors SK1 or SK2. FIG. 7(a) shows the case where an image failure is generated outside a character image, and FIG. 7(b) shows the case where an image failure is generated in a character image. Image failure DF is generated in cases where dusts such as paper dust attach on a slit glass structuring a reading window, or a failure pixel exists in a light receiving element. The Image failure generated by these causes appears as a high density area such as a black spot on an image due to low output level from the reading sensor.

In the case of image failure generation shown in FIGS. 7(a) and 7(b), image processing section GP executes the processing to remove image failure DF, for example, by comparing a reading sensor output shown in FIG. 7(a) with a reading sensor output shown in FIG. 7(b).

As the processing to remove image failure DF, for example, there is a method to execute AND operation (logical multiplication) on outputs DT1 and DT2 respectively outputted from reading sensors SK1 and SK2. By this method the image failure, where unwanted image data exist, can be eliminated.

Figure 8A:
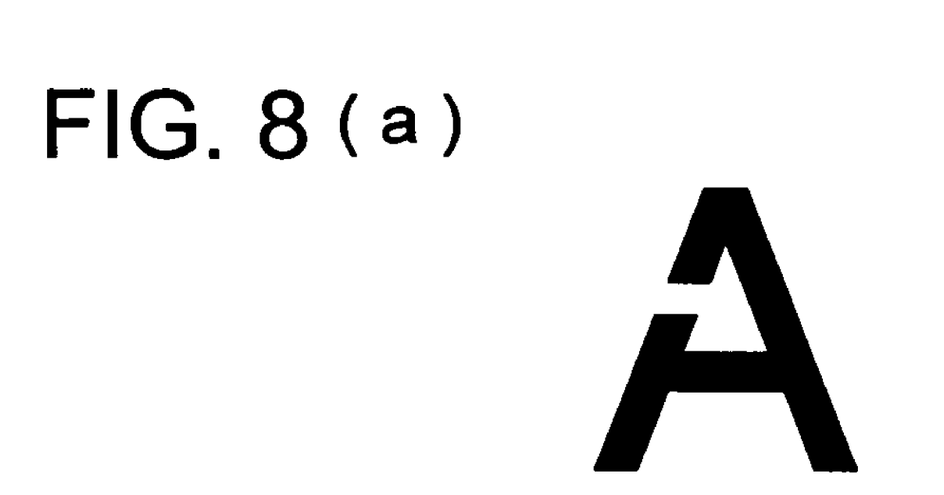
Figure 8B:
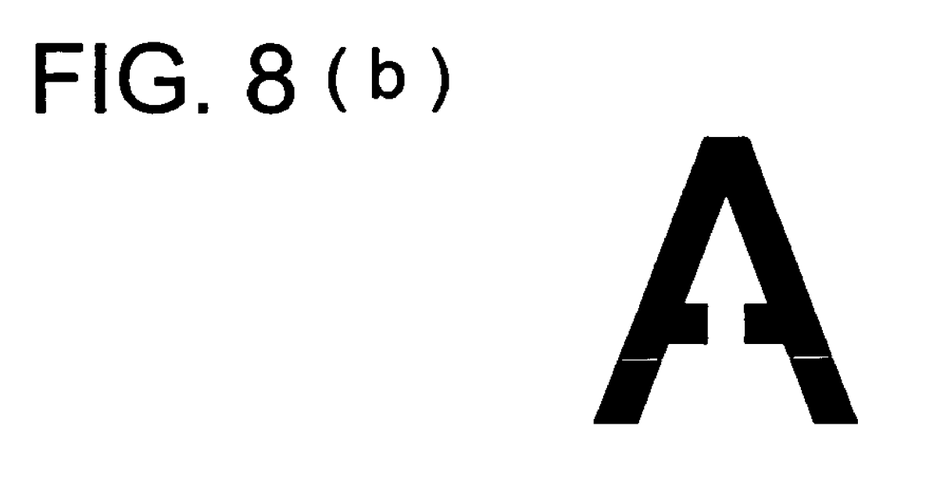

Next, other patterns of image failure generated at reading sensors SK1 and SK2 are shown in FIGS. 8(a) and 8(b). Both patterns of FIGS. 8(a) and 8(b) are generated, for example, in cases where some pixels are in failure in each CCD of reading sensor SK1 or SK2. As the processing to remove this kind of image failure, for example, there is a method to execute OR operation (logical addition) on outputs DT1 and DT2 respectively outputted from reading sensors SK1 and SK2. By this method missing image data in an image data set are interpolated and the image failure can be eliminated.

In this way, the image failure can be eliminated by executing AND operation or OR operation onto the outputs from the reading sensors.

(Double Face Reading)

FIG. 9(a)-9(i) are diagrams showing example operations of an image reading apparatus in the case of double face reading.

In the explanation below, notations of other than the reading sensors and the original documents are referred to the notations shown in FIG. 2.

In the double face reading, gate G1 guides the original document into switchback section SW.

Figure 9A:
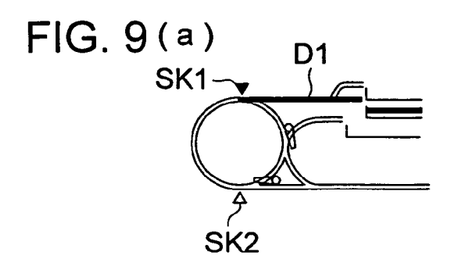

As shown in FIG. 9(a), original document D1 is fed from sheet supply tray TR1A or TR1B, and the first time reading of the first face of original document D1 is conducted by reading sensor SK1 at first reading position R1.

Figure 9B:
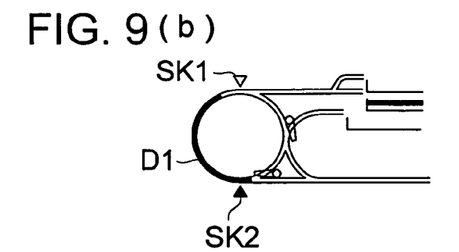

Next, as shown in FIG. 9(b), after the reading by reading sensor SK1, original-document D1 passes through reading position R2 of reading sensor SK2 while the second time reading of the first face of original document D1 is conducted.

Figure 9C:
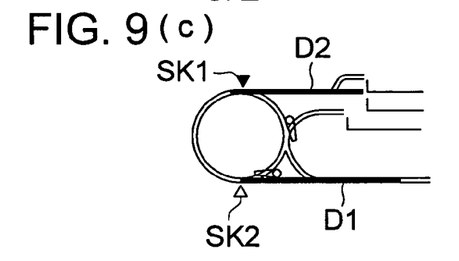
Figure 9D:
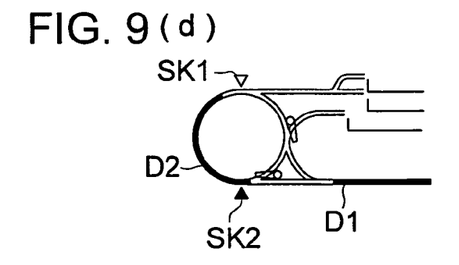
Figure 9E:
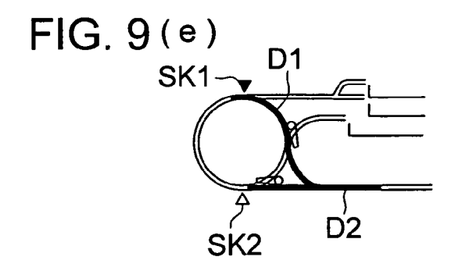

Next, as shown in FIG. 9(c), original document D1 is guided by gate G1 to enter into switchback section Sw, is guided further by gate G2 from switchback section to be transported through circulating transport path CH, and passes through first reading position R1 of first reading sensor SK1 while the first time reading of the second face of original document D1 is conducted (FIG. 9(e)).

Figure 9F:
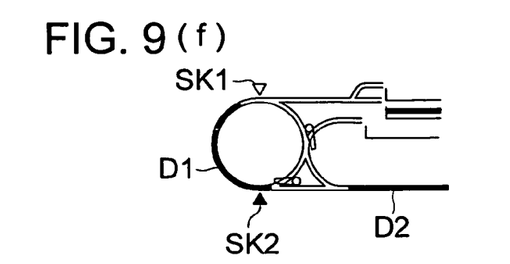
Figure 9G:
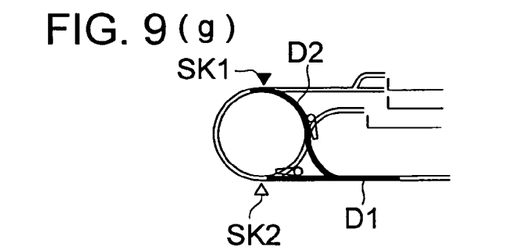

After the second face reading by reading sensor SK1, original document D1 proceeds along circulating transport path CH, and the second time reading of the second face of original document D1 is conducted (FIG. 9(f)).

Figure 9H:
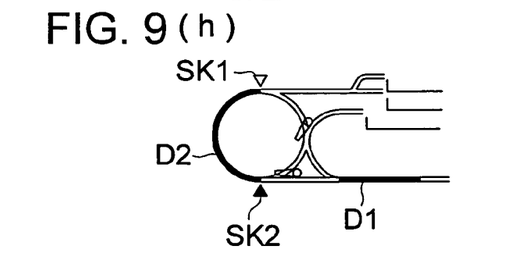
Figure 9I:
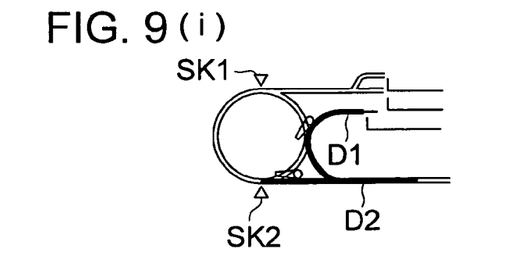

After the second face reading by reading sensor SK2, original document D1 proceeds into switchback section SW, and is ejected from switchback section onto exit tray TR2 (FIG. 9(h), FIG. 9(i)).

At the timing when first original document D1 enters into switchback section SW, second original document D2 is supplied. (FIG. 9(c)). Regarding second original document D2, conducted are, the first time reading of the first face by reading sensor SK1 at the stage shown in FIG. 9(c), the second time reading of the first face by reading sensor SK2 at the stage shown in FIG. 9(d), the first time reading of the second face by reading sensor SK1 at the stage shown in FIG. 9(g), and the second time reading of the second face by reading sensor SK2 at the stage shown in FIG. 9(h).

Same as the case of single face reading, also in the case of double face reading, image failures can be eliminated by the image processing, the image processing generating one image data set by using two image data sets obtained through two times reading conducted for each of the first face and the second face of the original document.

FIGS. 10(a)-10(l) illustrate another embodiment capable of double face reading.

In the embodiment of FIGS. 10(a)-10(l), switchback section SW is provided at upstream of second reading sensor SK2.

Also in the present embodiment, a single face reading is conducted in the same way as described above using FIGS. 3(a)-3(d), and a double face reading is conducted as described below.

Figure 10:
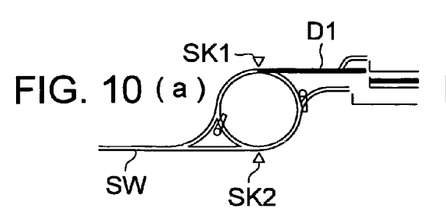

First original document D1 is fed, passing first reading position R1, and enters into switchback section SW (FIGS. 10(a), 10(b), 10(c)). At the stage of FIG. 10(a) to 10(b), when original document D1 passes first reading position R1, a reading is not conducted.

Original document D1 is reversed front/rear faces, and while original document D1 passes through second reading position R2, reading sensor SK2 conducts the first time reading of the second face (rear face of original document stacked at sheet supply trays TR1A and TR1B) of original document D1 (FIG. 10(d).

After the first face reading by reading sensor SK2, original document D1 proceeds along circulating transport path CH and passes first reading position R1, and reading sensor SK1 conducts the second time reading of the second face of original document (FIG. 10(e)).

Next, original document D1 proceeds into switchback section SW, and after being reversed front/rear faces passes through second reading position R2, and reading sensor SK2 conducts first time reading of the first face (upper face of original document stacked at sheet supply trays TR1A and TR1B) of original document D1 (FIG. 10(h)).

After the first time reading of the first face, original document D1 proceeds along circulating transporting path, and the second time reading of the second face of original document D1 is conducted while original document D1 passes through first reading position R1 (FIG. 10(i)).

After the second time reading of the first face, original document D1 is ejected onto exit tray TR2 (FIG. 10(k), FIG. 10(l)).

Second original document D2 is fed at the stage shown in FIG. 10(g) when first original document D1 passes switchback section SW at second time, and waits in switchback section SW until the stage shown in FIG. 10(k) when trailing edge of first original document D1 passes second reading position R2.

At the stage when the trailing edge of first original document D1 have passed, second original document D2 starts from switchback section SW, and double face reading of second original document D2 is conducted.

In this way, by feeding second original document at early stage when switchback section SW become acceptable, and making the second original document wait at switchback section, early reading of second original document becomes possible and reading efficiency can be improved.

Also in the present embodiment, image processing section GP generates one image data set from two image data sets obtained through two times reading by reading sensors SK1 and SK2, this makes it possible to eliminate image failures and to obtain image data sets for high quality image formation.

According to the present embodiment, since image data sets obtained by plural reading sections are processed to generate one image data set, image failure caused by dusts attached on a reading window or caused by pixel failure in a reading section can be preferably corrected, and image data sets for high quality image formation can be obtained.

Further, even in the case of double face reading, by utilizing two reading sensors to generate two image data sets for each face of original document, corrected image data set is obtained from the two image data sets, which makes possible of high image quality single sided and double sided image formation with the use of simple structured image reading apparatus.

Further, by the copying apparatus of the present embodiment, image formation with high image quality can be achieved.

What is claimed is:

1. An image reading apparatus comprising:
   a circulating transport path for transporting an original document to circulate;
   plural reading sections, which are provided at different positions from each other in the circulating transport path, for respectively reading a single image plane on a same single face of the original document, to generate plural image data sets for the single image plane; and
   an image processing section for processing the plural image data sets generated by the plural reading sections, and creating one image data set for the single image plane on the same single face of the original document based on the plural image data set.

2. The image reading apparatus of claim 1, wherein the image processing section executes logical addition on the plural image data sets generated by the plural reading sections to create the one image data set.

3. The image reading apparatus of claim 1, wherein the image processing section executes logical multiplication on the plural image data sets generated by the plural reading sections to create the one image data set.

4. The image reading apparatus of claim 1, further comprising a switchback section for switchback transportation of the original document in cases of reading both faces of the original document, wherein in the cases of reading double faces of the original document, the plural reading sections respectively read a single image plane on a same single face of the double faces of the original document to generate plural image data sets for the single image plane which are to be sent to the image processing section.

5. The image reading apparatus of claim 4, wherein the switchback section is provided branching from the circulating transport path at a downstream side of the plural reading sections;

wherein in the case of reading image planes on both faces of the original document:

after a front face image plane of the original document having been read by a first reading section provided upstream side, in original document transporting direction, among the plural reading sections, the original document is transported through the circulating transport path to a reading position of a second reading section provided at downstream side of the first reading section;

after the front face image plane of the original document having been read again by the second reading section, the original document is transported to the switchback section for switchback transportation;

the original document is transported through the circulating transport path to the reading position of the first reading section in a front/rear reversed state;

after a rear face image plane of the original document having been read by the first reading section, the original document is transported to the reading position of the second reading section; and after the rear face image plane of the original document having been read again by the second reading section, the original document is front/rear reversed again through the switch back section to be ejected.

6. The image reading apparatus of claim 4, wherein the switchback section is provided branching from the circulating transport path in-between the plural reading sections;

wherein in the case of reading image planes on both faces of the original document:

the original document is transported to pass a reading position of a first reading section provided upstream side, in original document transporting direction, among the plural reading sections, through the circulating transport path, and is carried into the switchback section;

after switchback transportation, an image plane on a rear face of the document is read by a second reading section provided at downstream side of the first reading section in the original document transporting direction:

the original document is transported through the circulating transport path to the reading position of the first reading section, and after the image plane on the rear face of the document having been read again by the first reading section, the original document is transported through the circulating transport path into the switchback section;

after another switchback transportation, a front face image plane of the original document is read by the second reading section, and the original document is transported through the circulating transport path to the reading position of the first reading section; and after the front face image plane of the original document having been read by the first reading section, the original document is transported to pass, through the circulating transport path, the reading position of the second reading section to be ejected.

7. A copying apparatus comprising:

an image reading apparatus which comprises;

a circulating transport path for transporting an original document to circulate, plural reading sections, which are provided at different positions from each other in the circulating transport path, for respectively reading a single image plane on a same single face of the original document, to generate plural image data sets for the single image plane; and an image processing section for processing the plural image data sets generated by the plural reading sections, and creating one image data set for the single image plane on the same single face of the original document based on the plural image data set an image forming apparatus which forms an image based on the image data set created by the image reading apparatus.

* * * * *